United States Patent [19]

Ebnother et al.

[11] 3,859,290

[45] *Jan. 7, 1975

[54] 3-[1-(4-PHENYL-4-OXOBUTYL)-4-HYDROXY-4-PIPERIDYL]DIHYDRO-2(3H) FURANONES

[75] Inventors: Anton Ebnother, Arlesheim; Erwin Rissi, Basel, both of Switzerland

[73] Assignee: Sandoz Ltd. (also known as Sandoz AG), Basle, Switzerland

[*] Notice: The portion of the term of this patent subsequent to June 19, 1990, has been disclaimed.

[22] Filed: Mar. 4, 1971

[21] Appl. No.: 121,140

[30] Foreign Application Priority Data
Mar. 20, 1970 Switzerland.......................... 4259/70
Sept. 2, 1970 Switzerland...................... 13190/70

[52] U.S. Cl............................ 260/293.67, 424/267
[51] Int. Cl............................................ C07d 29/24
[58] Field of Search............................... 260/293.67

[56] References Cited
UNITED STATES PATENTS

| | | | |
|---|---|---|---|
| 3,074,952 | 1/1963 | Casy et al. | 260/293.67 |
| 3,740,406 | 6/1973 | Ebnother et al. | 260/293.67 |
| 3,740,407 | 6/1973 | Ebnother et al. | 260/293.67 |

Primary Examiner—Henry R. Jiles
Assistant Examiner—S. D. Winters
Attorney, Agent, or Firm—Gerald D. Sharkin; Robert S. Honor

[57] ABSTRACT

The invention concerns novel compounds of the formula:

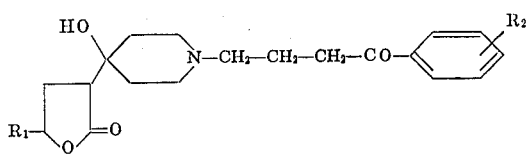

wherein
$R_1$ is hydrogen or alkyl of one to three carbon atoms, and
$R_2$ is hydrogen, fluorine, chlorine, bromine, alkyl of one to three carbon atoms, alkoxy of one to three carbon atoms, or an amido radical in which the alkyl group is of one to three carbon atoms,
and pharmaceutically acceptable acid addition salts thereof.

The compounds are analgesics.

11 Claims, No Drawings

3-[1-(4-PHENYL-4-OXOBUTYL)-4-HYDROXY-4-PIPERIDYL]DIHYDRO-2(3H) FURANONES

This invention relates to substituted piperidyl furanones.

In accordance with the invention there are provided new compounds of formula I,

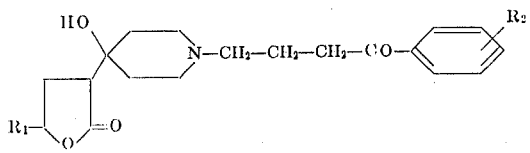

wherein
  $R_1$ is hydrogen or alkyl of one to three carbon atoms, and
  $R_2$ is hydrogen, fluorine, chlorine, bromine, alkyl of one to three carbon atoms, alkoxy of one to three carbon atoms, or an amido radical in which the alkyl group is of one to three carbon atoms,
and acid addition salts thereof.

Further, in accordance with the invention a compound of formula I is obtained by a process comprising condensing a compound of formula II,

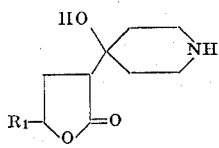

wherein $R_1$ is as defined above, with a compound of formula III,

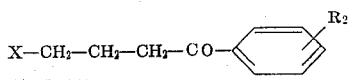

wherein $R_2$ is as defined above, and
X is the acid radical of a reactive ester, in the presence of an acid-binding agent. The resulting compound of formula I may be isolated in the form of a free base or an acid addition salt thereof.

The reaction is preferably effected in an inert solvent, e.g., an aromatic hydrocarbon such as benzene, toluene or xylene, a dialkyl amide of a lower aliphatic monocarboxylic acid, in which alkyl is of one to four carbon atoms, such as dimethyl formamide, or a chlorinated aliphatic hydrocarbon such as chloroform or carbon tetrachloride.

Examples of acid-binding agents which may be used are alkali metal carbonates such as potassium carbonate or sodium carbonate, tertiary amines such as triethyl amine or pyridine, or an excess of a compound of formula II.

In the compounds of formula III, X may, for example, signify chlorine, bromine or the acid radical of an organic sulphonic acid, such as an alkyl-sulphonyloxy or aryl-sulphonyloxy radical, but preferably, however, signifies chlorine. The reaction may be accelerated by heating and/or thoroughly mixing the reaction mixture; the reaction proceeds satisfactorily at temperatures between 50°C and the reflux temperature.

The process of the invention may, for example, be effected by adding a compound of formula II and the acid-binding agent, e.g., an alkali metal carbonate, preferably potassium carbonate, to a solvent such as toluene or dimethyl formamide, adding the compound of formula III and subsequently heating the reaction mixture, e.g., with stirring, optionally to the boiling temperature of the reaction mixture, and after the reaction is complete, the compound of formula I may be isolated in accordance with known methods and may be purified.

Of the compounds of formula II, the compound of formula IIa

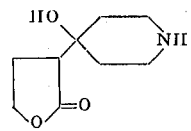

is known. The compounds of formula IIb,

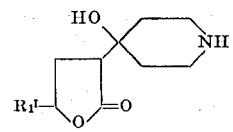

wherein $R_1{}'$ is alkyl of one to three carbon atoms, are new and may be obtained by debenzylating a compound of formula IV,

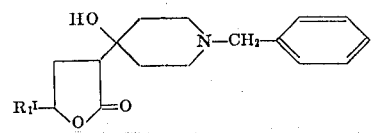

wherein $R_1{}'$ is as defined above. The removal of the benzyl group may, for example, be effected by catalytic hydrogenation of the compound of formula IV in an inert solvent, e.g., glacial acetic acid, preferably using a palladium catalyst, at a slightly elevated pressure and slightly elevated temperature (e.g., at 6 atmospheres/60°C).

The compounds of formula IV, used as starting materials, may, for example, be produced by reacting 1-benzyl-4-piperidone in the presence of an alkali metal amide, e.g., lithium amide, in an inert solvent, e.g., liquid ammonia and/or absolute ether, or liquid ammonia and/or absolute tetrahydrofuran, with a γ-lactone of formula V,

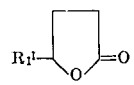

wherein $R_1{}'$ is as defined above, and hydrolyzing the resulting reaction product, e.g., with an aqueous ammonium chloride solution.

Insofar as the production of the starting materials is not described, these are known or may be produced in accordance with known processes or in a manner analogous to the processes described herein or to known processes.

The compounds of formula I and pharmaceutically acceptable acid addition salts thereof are useful because they possess pharmacological activity in animals. More particularly, the compounds are useful analgesics, as indicated by the hot plate test in mice, the phenyl benzoquinone syndrome test in mice and the monkey tail test in monkeys (D. Römer, Proceedings of the International Symposium on Pain, Paris, Apr. 1967, in "Pain," Academic Press, New York, London, 1968, pp. 165–170).

For the abovementioned use, the dose administered will naturally vary depending on the compound employed, the mode of administration and the treatment desired. However, in general, satisfactory results are obtained at daily dosages between about 0.5 and 30 milligrams per kilogram animal body weight, conveniently given in divided doses 2 to 3 times a day or in sustained relase form. For the large mammals, the daily dose is from about 30 mg to about 150 mg and unit dosage forms suitable for oral administration contain between about 10 and 75 mg of the compound, in association with a pharmaceutical carrier or diluent.

A compound possessing particularly interesting properties is 3-[1-(4-p-fluorophenyl-4-oxobutyl)-4-hydroxy-4-piperidyl] dihydro-2(3H)-furanone.

Suitable pharmaceutically acceptable acid addition salt forms include mineral acid salts such as the hydrochloride, hydrobromide and sulphate, and organic acid salts such as the fumarate, maleate, tartrate, methane-, ethane- and benzene-sulphonate, citrate and malate.

The following Examples illustrate the invention. All temperatures therein are indicated in degrees Centigrade and are uncorrected.

EXAMPLE 1

3-[1-(4-p-Fluorophenyl-4-oxobutyl)-4-hydroxy-4-piperidyl]dihydro-2(3H)-furanone

A mixture of 18.5 g of dihydro-(4-hydroxy-4-piperidyl)-2(3H)-furanone, 20.0 g of ω-chloro-4-fluorobutyrophenone and 13.8 g of potassium carbonate in 300 cc of toluene is heated to the boil for 8 hours while stirring. The inorganic salts are filtered off, the filtrate is washed with water, the organic phase is dried over magnesium sulphate and the solvent is evaporated. The resulting residue is dissolved in ethanol and the calculated amount of hydrochloric acid in ethanol is added. After the addition of ether the hydrochloride of the title compound, having a M.P. of 170°–172°, crystallizes.

EXAMPLE 2

Dihydro-3-[4-hydroxy-1-(4-oxo-4-phenylbutyl)-4-piperidyl]-2(3H)-furanone

A solution of 14.7 g of ω-chlorobutyrophenone in 50 cc of dimethyl formamide is added at a temperature of 60° within one hour and while stirring to a solution of 20.0 g of dihydro-3-(4-hydroxy-4-piperidyl)-2(3H)-furanone in 100 cc of dimethyl formamide. The reaction mixture is allowed to react at 60° for a further 5 hours and is subsequently diluted with 150 cc of benzene. The hydrochloride of the excess dihydro-3-(4-hydroxy-4-piperidyl)-2(3H)-furanone, which crystallizes after allowing the reaction mixture to stand in a refrigerator for an extended period, is filtered off and washed with ether. The combined filtrates are poured on a mixture of 200 g of ice and 5 cc of concentrated ammonium hydroxide solution. Extraction is effected thrice with benzene, the extracts are washed thrice with ice water, dried over magnesium sulphate, and the solvent is evaporated. The resulting crude base is dissolved in acetone, the calculated amount of hydrochloric acid in ethanol and ether are added until the solution is turbid. The resulting crude hydrochloride is further purified by recrystallization from methanol and yields the pure title compound as hydrochloride, having a M.P. of 223°–225° (decomp.).

EXAMPLE 3

3-[1-(4-p-Bromophenyl-4-oxobutyl)-4-hydroxy-4-piperidyl]dihydro-2(3H)-furanone

Dihydro-3-(4-hydroxy-4-piperidyl)-2(3H)-furanone is reacted in accordance with the process described in Example 2 with 4-chloro-p-bromobutyrophenone. The reaction is carried out for a period of 14 hours at 60°. The hydrochloride of the title compound has a M.P. of 223°–226° (decomp.) (from methanol).

EXAMPLE 4

3-[1-(4-p-Chlorophenyl-4-oxobutyl)-4-hydroxy4-piperidyl]dihydro-2(3H)-furanone

Dihydro-3-(4-hydroxy-4-piperidyl)-2(3H)-furanone is reacted in accordance with the process described in Example 2 with 4-chloro-p-chlorobutyrophenone. The reaction is carried out for a period of 14 hours at 60°. The hydrochloride of the title compound has a M.P. of 199°–201° (decomp.) (from methanol/ether).

EXAMPLE 5

3-[1-(4-m-Fluorophenyl-4-oxobutyl)-4-hydroxy-4-piperidyl]dihydro-2(3H)-furanone

Dihydro-3-(4-hydroxy-4-piperidyl)-2(3H)-furanone is reacted in accordance with the process described in Example 2 with 4-chloro-m-fluorobutyrophenone. The reaction is carried out for a period of 14 hours at 60°. The hydrochloride has a M.P. of 181°–185° (decomp.) (from methanol/ether).

EXAMPLE 6

Dihydro-3-[4-hydroxy-1-(4-oxo-4-o-tolylbutyl)-4-piperidyl]-2(3H)-furanone.

Dihydro-3-(4-hydroxy-4-piperidyl)-2(3H)-furanone is reacted in accordance with the process described in Example 2 with 4-chloro-o-methylbutyrophenone. The reaction is carried out for a period of 14 hours at 60°. The hydrochloride of the title compound has a M.P. of 165°–167° (from methanol/ether).

EXAMPLE 7

Dihydro-3-[4-hydroxy-1-(4-oxo-4-m-tolylbutyl)-4-piperidyl]-2(3H)-furanone

Dihydro-3-(4-hydroxy-4-piperidyl)-2(3H)-furanone is reacted in accordance with the process described in Example 2 with 4-chloro-m-methylbutyrophenone. The reaction is carried out for a period of 5 hours at 60°. The hydrochloride of the title compound has a M.P. of 166°–170° (from methanol/acetone).

EXAMPLE 8

3-[1-(4-o-Anisyl-4-oxobutyl)-4-hydroxy-4-piperidyl]dihydro-2(3H)-furanone

Dihydro-3-(4-hydroxy-4-piperidyl)-2(3H)-furanone is reacted in accordance with the process described in Example 2 with 4-chloro-o-methoxybutyrophenone. The reaction is carried out for a period of 5 hours at 60°. The hydrochloride of the title compound has a M.P. of 165°–168° (from methanol/acetone/ether).

EXAMPLE 9

3-[1-(4-p-Anisyl-4-oxobutyl)-4-hydroxy-4-piperidyl]dihydro-2(3H)-furanone

Dihydro-3-(4-hydroxy-4-piperidyl)-2(3H)-furanone is reacted in accordance with the process described in Example 2 with 4-chloro-p-methoxybutyrophenone. The reaction is carried out for a period of 5 hours at 60°. The hydrochloride of the title compound has a M.P. of 212°–215° (decomp.) (from methanol).

EXAMPLE 10

Dihydro-3-[4-hydroxy-1-(4-oxo-4-p-tolylbutyl)-4-piperidyl]-2(3H)-furanone

Dihydro-3-(4-hydroxy-4-piperidyl)-2(3H)-furanone is reacted in accordance with the process described in Example 2 with 4-chloro-p-methylbutyrophenone. The reaction is carried out for a period of 14 hours at 60°. The title compound has a M.P. of 107°–109° (from benzene/petroleum ether).

What is claimed is:
1. A compound of the formula:

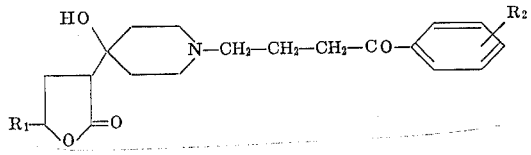

wherein $R_1$ is hydrogen or alkyl of one to three carbon atoms, and $R_2$ is hydrogen, fluorine, chlorine, bromine, alkyl of one to three carbon atoms, alkoxy of one to three carbon atoms, or an alkylamido radical in which the alkyl group is of one to three carbon atoms, or a pharmaceutically acceptable acid addition salt thereof.

2. The compound of claim 1, which is 3-[1-(4-p-flyorophenyl-4-oxobutyl)-4-hydroxy-4-piperidyl]dihydro-2(3H)-furanone.

3. The compound of claim 1, which is dihydro-3-[4-hydroxy-1-(4-oxo-4-phenylbutyl)-4-piperidyl]-2(3H)-furanone.

4. The compound of claim 1, which is 3-[1-(4-p-bromophenyl-4-oxobutyl)-4-hydroxy-4-piperidyl]dihydro-2(3H)-furanone.

5. The compound of claim 1, which is 3-[1-(4-p-chlorophenyl-4-oxobutyl)-4-hydroxy-4-piperidyl]dihydro-2(3H)-furanone.

6. The compound of claim 1, which is 3-[1-(4-m-fluorophenyl-4-oxobutyl)-4-hydroxy-4-piperidyl]dihydro-2(3H)-furanone.

7. The compound of claim 1, which is dihydro-3-[4-hydroxy-1-(4-oxo-4-o-tolylbutyl)-4-piperidyl]-2(3H)-furanone.

8. The compound of claim 1, which is dihydro-3-[4-hydroxy-1-(4-oxo-4-m-tolylbutyl)-4-piperidyl]-2(3A-furanone.

9. The compound of claim 1, which is 3-[1-(4-o-anisyl-4-oxobutyl)-4-hydroxy-4-piperidyl]dihydro-2(3H)-furanone.

10. The compound of claim 1, which is 3-[1-(4-p-anisyl-4-oxobutyl)-4-hydroxy-4-piperidyl]dihydro-2(3H)-furanone.

11. The compound of claim 1, which is dihydro-3-[4-hydroxy-1-(4-oxo-4-p-tolylbutyl)-4-piperidyl]-2(3H)-furanone.

* * * * *